United States Patent [19]

Beurrier

[11] 3,789,314

[45] Jan. 29, 1974

[54] AMPLIFIER UTILIZING INPUT SIGNAL POWER

[75] Inventor: Henry Richard Beurrier, Chester Township, Morris County, N.J.

[73] Assignee: Bell Telephone Laboratories, Incorporated, Murray Hill, N.J.

[22] Filed: Dec. 6, 1971

[21] Appl. No.: 204,864

[52] U.S. Cl. .................................. 330/185, 330/151

[51] Int. Cl. .................................................. H03f 1/00

[58] Field of Search ............ 333/1, 11, 28, 8 C, 4 C; 330/185, 53, 149, 124 R, 30 R, 151

[56] References Cited

UNITED STATES PATENTS

| | | | |
|---|---|---|---|
| 1,479,516 | 1/1924 | Scriver | 333/11 X |
| 1,819,648 | 8/1931 | Mathes | 333/11 X |
| 2,756,282 | 7/1956 | Pouma | 330/124 R X |
| 2,958,832 | 11/1960 | Clark | 330/151 X |
| 3,649,927 | 3/1972 | Serdel | 330/149 X |

*Primary Examiner*—Nathan Kaufman

*Attorney, Agent, or Firm*—S. Sherman

[57] ABSTRACT

The power from a signal source used to drive an amplifier is usually dissipated in a matching impedance. In accordance with the present disclosure, this input power is conserved and added to the amplifier output power, thereby enhancing the power gain of the amplifier. This technique is particularly advantageous when used with devices having low intrinsic gain.

11 Claims, 11 Drawing Figures

AMPLIFIER UTILIZING INPUT SIGNAL POWER

This application relates to electromagnetic wave amplifiers.

BACKGROUND OF THE INVENTION

In the copending application by H. Seidel, Ser. No. 113,201, filed Feb. 8, 1971, now abandoned and assigned to applicant's assignee, there is described a class of amplifiers using transistors connected in the common collector and in the common base configurations. Such amplifiers, because they are highly degenerative, tend to be very stable and capable of braodband operation. However, the same degeneracy, which makes possible their desirable characteristics, also limits the gain of the amplifier This is equally the case with other classes of amplifiers which employ degenerative feedback to improve the operating characteristics of the active element.

More generally, there are situations where the active elements available are such that, at best, power gain is difficult to realize.

It is, accordingly, the boad object of the present invention to increase the gain of amplifiers having low intrinsic gain.

SUMMARY OF THE INVENTION

In a typical high frequency amplifier, the power from the signal source that is used to drive the amplifier is dissipated in a matching impedance. Thus, the only power delivered to the output load is derived from the active elements. However, if the ability of the active elements to deliver a significant amount of power is limited, it would be advantageous to conserve this input power and then add it to the amplifier output power, thereby enhancing the power gain of the amplifier.

Thus, in accordance with the present invention, the signal source is coupled to a matching output circuit by means of two, parallel-connected wavepaths. One of these is a low-loss passive wavepath, such as a transmission line, which couples the source to the output circuit. The output circuit is an impedance match for the signal source and provides the only significant loading upon the signal source. The other wavepath is an active wavepath and includes one or more active elements.

At the input end, signal sampling means are provided to couple the signal source to the active wavepath. Signal injecting means are provided at the output end of the wavepaths for constructively summing, in the output circuit, the signal in the passive wavepath and the amplified output signal derived from the active wavepath. Depending upon the nature of the sampling means and the injecting means, and the relative time delay in the two wavepaths, compensating time delay networks and phase shifters are located in the respective wavepaths as required.

It is a feature and advantage of the invention that the signal source is match-terminated by the useful output load, rather than by a impedance matching dummy load. In this manner the source power is preserved and utilized, rather than being dissipated. Advantageously, there is no loading of the source by the active wavepath and the sampling network which couples the signal source to the active wavepath. At the output end of the amplifier, the signal injecting network advantageously maintains an impedance match between the output load and the signal source.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWINGS

Referring to the drawings, FIG. 1 shows, in block diagram, an amplifier in accordance with the present invention comprising an input circuit 10, including a signal source 17 having an output impedance $Z_o$; an output circuit 11, including a matching load 16 of impedance $Z_o$; a low-loss passive wavepath 12 having a characteristic impedance $Z_o$, coupling the input circuit to the output circuit; and an active wavepath 13 whose input end is coupled to the signal input circuit by means of a sampling network 14, and whose output end is coupled to the output circuit by means of a signal injecting network 15.

Figure 1:
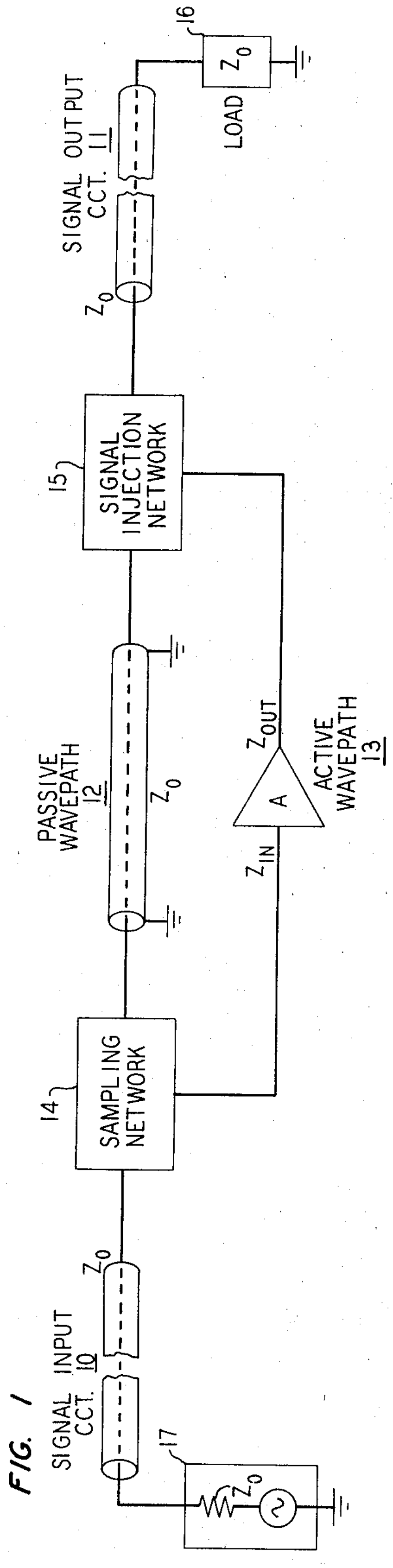
FIG. 1 shows, in block diagram, an amplifier in accordance with the present invention.

In operation, signal energy derived from source 17 is coupled to load 16 by means of wavepath 12. The signal is also coupled by means of sampling network 14 to the active wavepath 13, wherein it is amplified. The amplified signal is then injected into the signal output circuit 11 in such time and phase so as to add constructively in load 16 with the signal coupled to the load through wavepath 12.

In order for the circuit to operate efficiently in the manner described, the loading effect of the active wavepath on the signal input circuit is advantageously negligible. At the amplifier output, the amplified signal is advantageously directionally coupled into the signal output circuit so that all of the signal is combined in the load, and none is transmitted backward towards the signal input cicuit. These two preferred conditions broadly define the nature and properties of the sampling network, the active wavepath, and the signal injection network.

Figure 2:
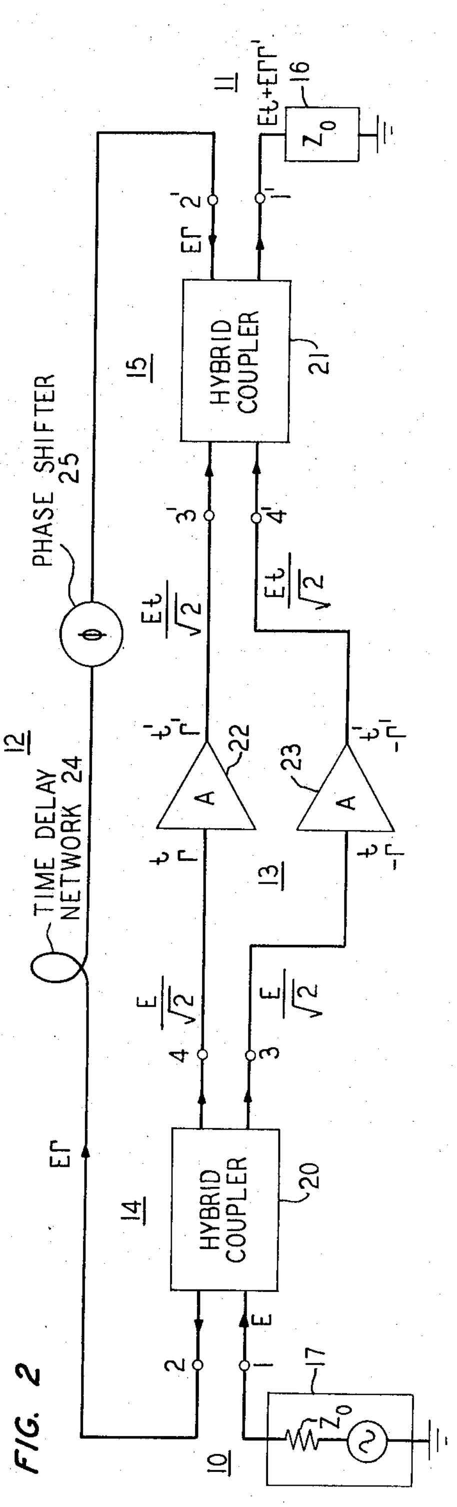
FIG. 2 shows a first embodiment of the invention.

FIG.2, now to be considered, is illustrative of a first specific embodiment of the invention. This particular circuit is a modification of the amplifier described in the above-identified Seidel application, comprising two hybrid couplers interconnected by means of a pair of dual active stages. Using the same identification numerals as in FIG. 1 to identify corresponding components, the sampling network 14 comprises a hybrid coupler 20; the signal injection network 15 comprises a hybrid coupler 21; and the active wavepath 13 comprises the two dual active stages 22 and 23.

Each of the couplers 20 and 21 has four branches 1,2, 3 and 4, and 1′, 2′, 3′ and 4′, arranged in pairs 1–2 and 3–4, and 1′–2′ and 3′–4′, where the branches of each pair are conjugate to each other and in coupling relationship with the branches of the other of said pair. Examples of such devices are the magic-T couplers, hybrid transformers, and quadrature couplers.

Each of the active stages 22 and 23 comprises one or more active elements arranged such that one stage is the dual of the other. As such, the coefficients of transmission for the two stages are equal, while the coefficients of reflection for the two stages are equal in magnitude but of opposite sign. Devices of this kind will be described in greater detail hereinbelow.

As illustrated in FIG. 2, input circuit 10 is coupled to branch 1 of input coupler 20. This branch constitutes the amplifier input port. Each active stage is connected between a different one of the branches of one pair of conjugate branches of the input coupler 20 and a different one of the branches of one pair of conjugate branches of the output coupler 21. Thus, stage 22 is connected between branch 4 of conjugate branches 3–4, and branch 3' of conjugate branches 3'–4', while stage 23 is connected between branches 3 and 4'. Output circuit 11 is connected to branch 1' of output coupler 21, constituting the amplifier output port.

In the above-identified Seidel application, the remaining branches 2 and 2' are match-terminated. In the embodiment of FIG. 2, however, branch 2 is connected to branch 2' by means of passive wavepath 12 which includes a time delay network 24 and a phase shifter 25.

In operation, a signal E applied to branch 1 of input coupler 20 is divided into two equal components $E/\sqrt{2}$ in branches 3 and 4. Because of their dual properties, equal signal components $Et/\sqrt{2}$ are transmitted by stages 22 and 23, and combine in branch 1' of output coupler 21 to produce a component of output signal $Et$.

A second pair of signal components, $E\Gamma/\sqrt{2}$ and $-E\Gamma/\sqrt{2}$, are reflected by the two active stages and, because of their 180 degree phase difference, combine in branch 2 of input coupler 20. In the above-identified Seidel application, these reflected components of the input signal are dissipated in the matching impedance terminating branch 2. By contrast, in the instant case, the signal $E\Gamma$, in branch 2, is coupled by means of passive wavepath 12 to branch 2' of output coupler 21 wherein it again divides into two equal components $E\Gamma/\sqrt{2}$ in branches 3' and 4'. These components are then reflected at the output ports of active stages 22 and 23, producing the two components $E\Gamma\Gamma'/\sqrt{2}$ and $-E\Gamma\Gamma'/\sqrt{2}$ which recombine in coupler branch 1'. By adjusting the relative time delay and the relative phase of the signals in the active wavepath 13 and in the passive wavepath 12, the amplifed signal component $Et$ and the doubly reflected signal component $E\Gamma\Gamma'$ sum constructively in the output load 16. Thus, in the embodiment of FIG. 2, the component of the input signal that previously was dissipated in a matching termination is here conserved and added to the output signal.

As indicated hereinabove, active stages 22 and 23 have mutually dual characteristics. However, strict duality is not required. In practice, it is sufficient that the input and output impedances of the two active stages differ from the source and load impedances by an amount that is preferably an order of magnitude or more. Thus, mathematical duality is not required if the input impedances $Z_{in}$ and $Z'_{in}$ and the output impedances $Z_{out}$ and $Z'_{out}$ of stages 22 and 23 are related by $$Z_{in} << Z_o << Z'_{in} \quad (1)$$

$$Z_{out} << Z_o << Z'_{out}. \quad (2)$$

Under these conditions, $\Gamma$ and $\Gamma'$ are approximately equal to unity, and the output signal $E_o$ developed across the output load becomes $$E_o \approx Et + E. \quad (3)$$

In the case of unity gain amplifiers, for which $t = 1$, the output voltage produced is 2E, for a total output power of 4 $(E^2/Z_o)$. This, it will be noted, is four times the output power obtainable using the same amplifiers in accordance with the prior art. Thus, even unity gain amplifiers can be advantageously used in accordance with the present invention to produce 6 db of power gain.

FIGS. 3 through 7, now to be described, illustrate a number of dual active stages that can be employed to practice the invention. To simplify the drawings, the conventional direct current biasing circuits have been omitted.

Figure 3:
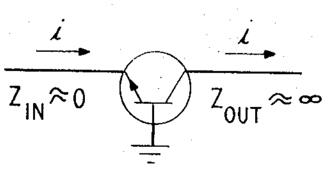
FIGS. 3, 4, 5, 6 and 7 illustrate a number of dual active stages that can be employed to practice the invention.
Figure 4:
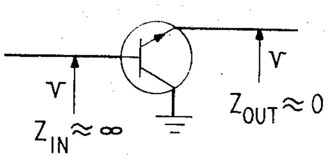

As is known, a transistor, connected in the common base configuration, as illustrated in FIG. 3, transforms a current i, with unity gain, from a low to a high impedance. To within a good approximation, the input impedance $Z_{in}$ of a common base transistor is zero, and its output impedance $Z_{out}$ is infinite. Conversely, a transistor connected in a common collector configuration, as illustrated in FIG. 4, transforms a voltage $v$, with unity gain, from a high impedance to a low impedance. To within an equally good approximation, the input impedance $Z_{in}$ of a common collector transistor is infinite, and its output impedance $Z_{out}$ is zero.

Figure 5:
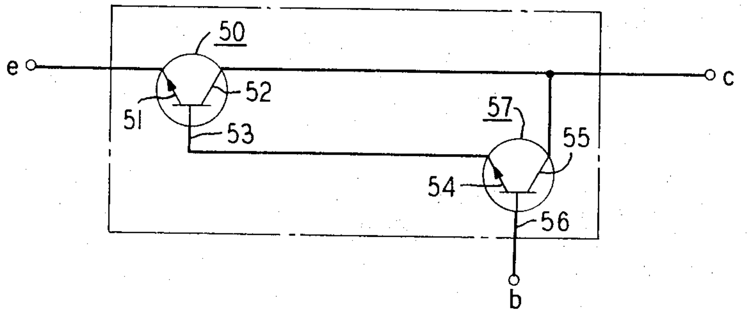

It will be recognized, however, that in a practical case the input and output impedances, if small, will be greater than zero and, if large, will be less than infinite. Nevertheless, relative to a specific source impedance $Z_o$, and a specific load impedance $Z'_o$, they can, for all practical purposes, be considered to be zero or infinite. If, however, a better approximation is required, a Darlington pair, as illustrated in FIG. 5, can be used. In this arrangement, the base 53 of a first transistor 50 is connected to the emitter 54 of a second transistor 57. The two collectors 52 and 55 are connected together to form the collector $c$ for the pair. The emitter 51 of transistor 50 is the pair emitter $e$, while the base 56 of transistor 57 is the pair base $b$.

The gain factor $\alpha$ for such a pair is given by $$\alpha = \alpha_1 + (1 - \alpha_1)\, \alpha_2 , \quad (4)$$

where $\alpha_1$ and $\alpha_2$ are the gain factors for transistors 50 and 57, respectively. If, for example, $\alpha_1$ and $\alpha_2$ are both equal to 0.95, the $\alpha$ for the Darlington pair is then equal to 0.9975. Correspondingly, the input and output impedances for a Darlington pair more nearly approach the ideal values.

It will be noted that there is an impedance transformation between input and output for each of the transistor configurations illustrated in FIGS. 3 and 4. However, there is no reason why the same active stage cannot have both the lower input and the lower output impedances, while the other active stage has the higher input and the higher output impedances. Active stages of these sorts are illustrated in FIGS. 6 and 7.

Figure 6:
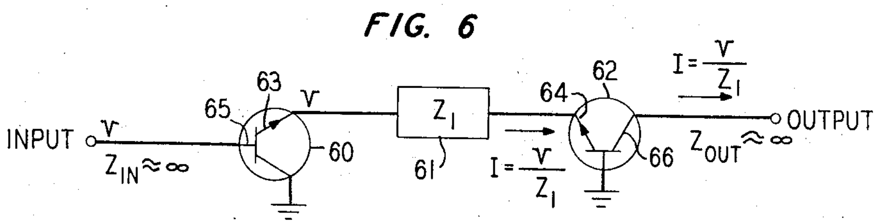

In the embodiment of FIG. 6, a first transistor 60, connected in the common collector configuration, is coupled to a second transistor 62, connected in the common base configuration, through a series impedance 61. In operation, a voltage $v$ applied to the base 65 of transistor 60 induces a voltage $v$ at the emitter 63 which is impressed across impedance 61. This, in turn, causes a current $v/Z_1$ to flow into the emitter 64 of transistor 62, producing an output current $I = v/Z_1$ in collector 66.

Figure 7:
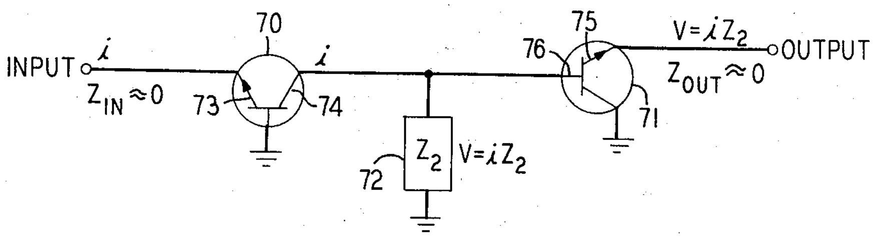

In the embodiment of FIG. 7, a first transistor 70, connected in the common base configuration, is coupled to a second transistor 71 by means of a shunt impedance 72. In operation, a current $i$ applied to the emitter 73 of transistor 70 causes a current $i$ in the collector 74. This current, flowing through impedance 72 produces a voltage $V = iZ_2$ at the base 76 of transistor 71. This, in turn, produces an equal output voltage $V = iZ_2$ at the emitter 75 of transistor 71.

It will be noted that in each of these circuits the input impedance $Z_{in}$ and the output impedance $Z_{out}$ are of the same order of magnitude. Ideally, the input and output impedances for the circuit shown in FIG. 6 are infinite, whereas in the embodiment shown in FIG. 7, these impedances are zero.

FIGS. 8–11, now to be considered, show four specific circuits which are illustrative of the variety of amplifiers that can be designed in accordance with the teachings of the present invention. As previously, the same identification numerals as were used in FIG. 1 will be used to identify corresponding components in these several embodiments.

Figure 8:
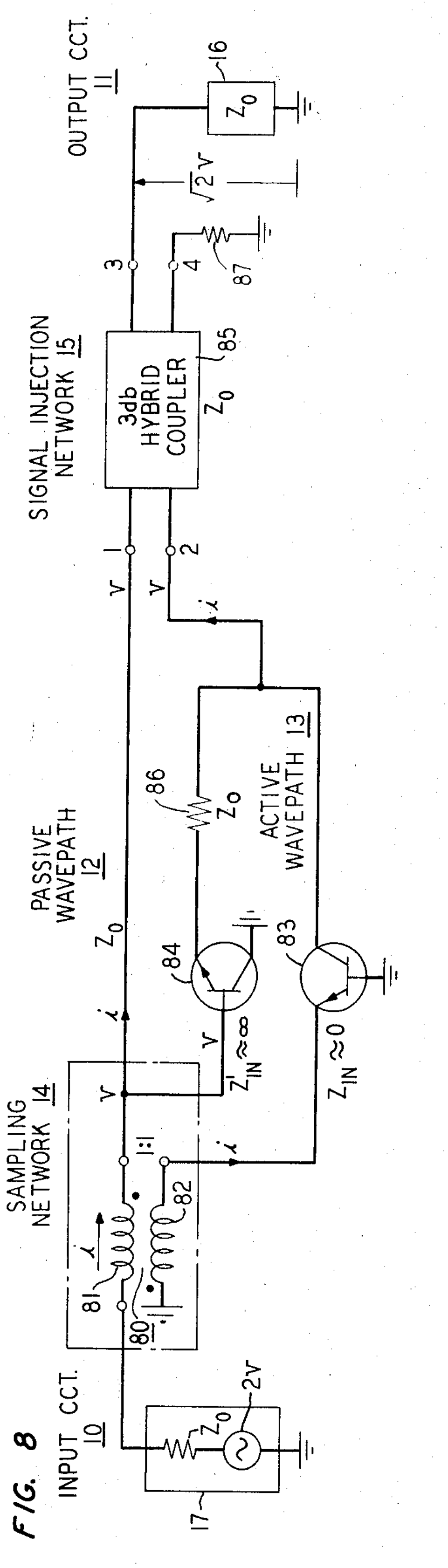
FIGS. 8, 9, 10 and 11 show various alternate embodiments of the invention.

In the emobodiment of FIG. 8, the sampling network 14 comprises a 1:1 turns ratio transformer 80, one of whose windings 81 is connected in series between the input circuit 10 and one end of the passive wavepath 12. The other transformer winding 82 is connected between ground and one of the two active stages comprising active wavepath 13. For purposes of illustration, the active stages are transistors 83 and 84 connected, respectively, in the common base configuration and the common collector configuration illustrated in FIGS. 3 and 4. In particular, winding 82 is connected to the input terminal of the lower input impedance stage, i.e., the emitter electrode of transistor 83. The input terminal of the higher impedance stage, i.e., the base electrode of transistor 84, is connected directly to the junction of winding 81 and passive wavepath 12

At their respective output ends, the emitter of transistor 84 is coupled through a series impedance 86, of magnitude $Z_o$, to branch 2 of a 3db hybrid coupler 85, while the collector of transistor 83 is coupled directly (i.e. through a low impedance connection) to branch 2 of the same coupler.

The output end of wavepath 12 is coupled to branch 1 of coupler 85. The output circuit 11, including the useful load 16, is connected to coupler branch 3. Branch 4 is match-terminated by means of an impedance 87 of magnitude $Z_o$.

As indicated hereinabove, the input impedance $Z'_{in}$ of transistor 84, connected in the common collector configuration, is very high (i.e. $Z'_{in} \approx \infty$ ). Accordingly, the shunting effect of this stage upon the signal source is essentially nil. The input impedance $Z_{in}$ of the transistor 83, connected in the common base configuration, on the other hand, is very small (i.e. $Z_{in} \approx 0$). Accordingly, the impedance coupled in series with wavepath 12 through transformer 80 is essentially zero. Thus, for all practical purposes, the only loading upon the signal source 17 is the $Z_o$ provided by load 16 as coupled through hybrid coupler 85. Designating the open circuit voltage of source 17 as 2v, the resulting signal current $i$ is given by $$i = (2v/2Z_o) = (v/Z_o)\ . \quad (5)$$

Thus, the signal voltage applied to stage 84 is $v$ and the signal current applied to stage 83 is $i$, where $v$ and $i$ are related as set forth in equation (5).

Energized in this manner, a net current equal to $i$ is produced at the output of the active wavepath 13, as described in my copending application, Ser. No. 113,200, filed Feb. 8, 1971, and assigned to applicant's assignee. This current, flowing into branch 2 of coupler 85 produces a voltage $v=i\ Z_o$. Correspondingly, an equal signal current flowing into branch 1 produces an equal voltage $v$ at this coupler branch. With the relative time delay and phase of these two signals properly adjusted (by means not specifically shown), the two signals sum constructively in coupler branch 3, to produce an output signal $\sqrt{2}\ v$ across the output load 16.

It will be noted that, in this embodiment of the invention, equal power, equal to $v^2/Z_o$, is delivered to the load by the signal source 17 and by the active stages 83 and 84, for a net power gain of 3db. In the absence of passive wavepath 12, connecting source 17 to load 16, the amplifier would have no net power gain.

Thus, the embodiment of FIG. 8 also illustrates how power gain can be realized using active stages that, inherently, provide no net gain. In addition, it will be noted that there is no loading of the signal source by the active wavepath, and that there is an impedance match maintained between the signal source and the output load. Thus, all the preferred operating conditions are fulfilled by the embodiment of FIG. 8.

Additional gain can be obtained by replacing the single transistors 83 and 84 by the cascade of transistors shown in FIGS. 6 and 7. An alternative arrangement, using only two transistors, is illustrated in FIG. 9.

Figure 9:
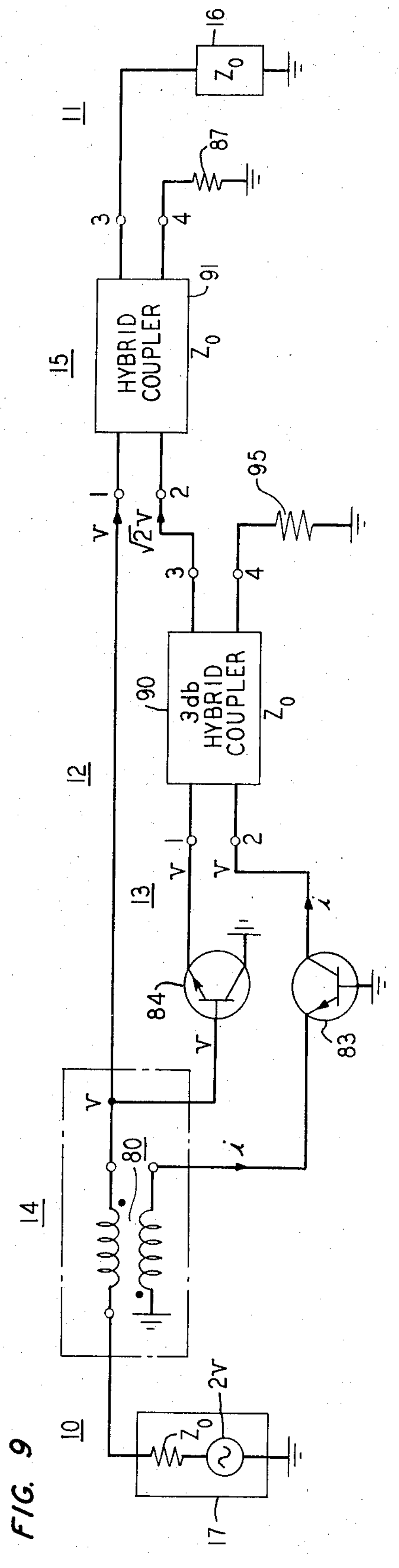

The amplifier shown in FIG. 9 is basically the same as the one shown in FIG. 8 with two differences. The first difference relates to the manner in which the transistor outputs are combined. In this second embodiments, each transistor is connected directly to a different branch of a 3db hybrid coupler of characteristic impedance $Z_o$, and their outputs combined thereby. The second difference resides in the signal injection network 15. Whereas a 3db coupler is used in the embodiment of FIG. 8, a somewhat different ratio coupler is used in the embodiment of FIG. 9.

Referring more specifically to the embodiment of FIG. 9, the same sampling network 14, comprising transformer 80, couples a voltage $v$ to the base of transistor 84, and a current $i$ to the emitter of transistor 83, where $$v = i\ Z_o\ . \quad (6)$$

A substantially equally voltage $v$, developed at the emitter of transistor 84, is, in turn, applied to branch 1 of coupler 90. Similarly, output current $i$, at the collector of transistor 83, is applied to branch 2 of coupler 90, developing at this branch a voltage $iZ_o$ equal to $v$, where $Z_o$ is the coupler impedance. The two signals are phased, as required, (by means not shown) so as to sum constructively in branch 3 of coupler 90, producing a combined output signal of $\sqrt{2}v$ volts. Conjugate branch 4 is match-terminated by means of an impedance 95 of magnitude $Z_o$.

As previously, the signal along passive wavepath 12 is coupled to branch 1 of the hybrid coupler 91 comprising the signal injection network, and the output from the active wavepath 13 is coupled to branch 2. In order that these two signals combine constructively in output branch 3, the sum to zero in branch 4, requires that $$e_3 = vt + \sqrt{2}\, v\, k, \tag{7}$$

$$\text{and } 0 = vt - \sqrt{2}\, v\, k, \tag{8}$$

where $t$ is the coefficient of coupling between coupler branches 1–3 and 2–4; and $k$ is the coefficient of coupling between branches 1–4 and 2–3. Also noting that $$|k|^2 + |t|^2 = 1, \tag{9}$$

we derive that $$t = \sqrt{1/3} \tag{10}$$

$$\text{and } k = \sqrt{2/3}, \tag{11}$$

for coupler 91.

It will be noted that in this embodiment of the invention, the power delivered directly by the signal source is equal to $v^2/Z_o$, as in the embodiment of FIG. 8. The power delivered by the active wavepath, however, is now $2(v^2/Z_o)$, or twice that provided by the arrangement of FIG. 8. The total power output is, therefore, $3(V^2/Z_o)$, for a net power gain of 4.8 db. Thus, the addition of a second coupler results in an amplifier having a higher power gain.

Figure 10:
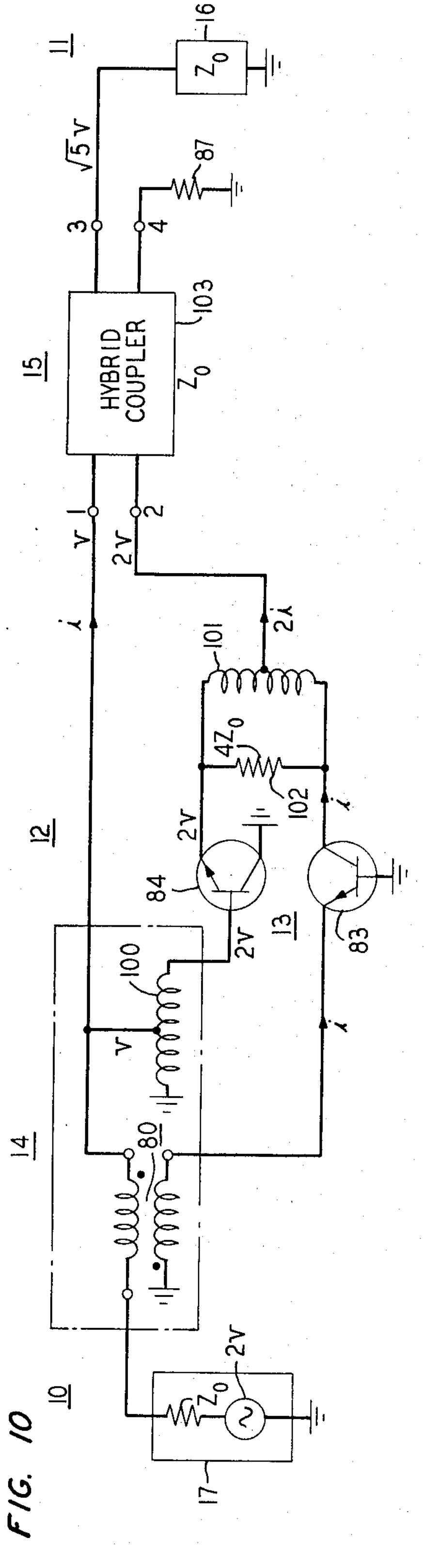

FIG. 10 shows yet another embodiment of the present invention using an output coupling circuit for the two active stages of the type disclosed in U.S. Pat. No. 3,694,765. As described therein, the output terminals of the active stages are interconnected by means of an autotransformer. The output signal is taken from a center-tap along the transformer, and a matching impedance is connected in shunt with the transformer. Thus, in FIG. 10, an autotransformer 101 is connected between the emitter of transistor 84 and the collector of transistor 83. A matching resistor 102 of magnitude $4Z_o$ is connected in shunt with the transformer. An output signal is extracted from a center-tap along transformer 101 and coupled to branch 2 of a hybrid coupler 103.

It can be readily shown that an output current of $2i$ is produced by the active stages when transistor 83 is energized with a current $i$, and transistor 84 is energized by a voltage $2v$, where $v = i\, Z_o$. Accordingly, the sampling network 14 includes, as heretofore, a transformer 80 which couples a current $i$ to transistor 83. In addition, a 1:2 step-up autotransformer 100 is also included to transform the voltage $v$ along wavepath 12 to a voltage $2v$ at the base of transistor 84. This then satisfies the drive conditions for the two active stages.

At the signal injection network 15, the signal $v$ at branch 1, and the signal $2v$ at branch 2 combine in branch 3, to produce an output signal $\sqrt{5}v$ in branch 3 when the coupling coefficients of coupler 103 are such that $$t = \sqrt{1/5} \tag{12}$$

$$\text{and } k = 2\sqrt{1/5}. \tag{13}$$

As above, the power provided by the signal source is again $v^2/Z_o$. However, the power delivered by the active wavepath is $4(v^2/Z_o)$ for a total output power of $5(v^2/Z_o)$ and a net power gain for this amplifier of 7db.

Figure 11:
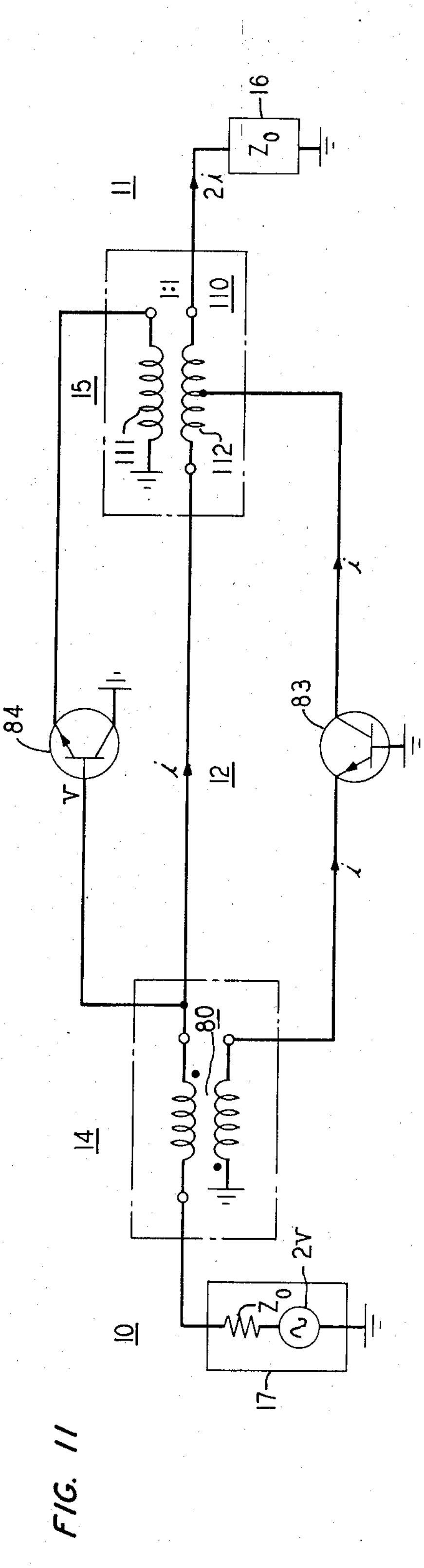

FIG. 11 shows another embodiment of the invention wherein the output terminals of the two active stages are separately connected directly to the signal injection network 15. This particular embodiment of the invention utilizes the signal injection circuit described in my copending application Ser. No. 113,213, filed Feb. 8, 1971, which comprises a 1:1 turns ratio transformer 110 connected to the active stages so as to directionally couple the signal to the output load.

Specifically, one winding 112 of transformer 110 is connected in series between passive wavepath 12 and the output load circuit 11. The higher output impedance stage, i.e., transistor 83, is connected to a center-tap on series winding 112. The other transformer winding 111 is connected between the output terminal of the lower output impedance stage and ground.

With stages 83 and 84 energized by a current $i$ and a voltage $v$, where $v = i\, Z_o$, a current 2i is delivered to the load $Z_o$. The total power in the load is $4(v^2/Z_o)$, for a net power gain of 6db.

In each of the illustrative embodiments the higher input impedance stage 84 was connected at the junction of transformer winding 81 and the passive wavepath 12. In some instances, however, it may be advantageous to make this connection at the other end of the winding (at the junction of the winding and the signal source) as a means of maintaining the signals applied to the two active stages in proper phase. Alternatively, delay equalization may best be realized by making this connection by means of a tap along winding 81. Thus, it will be recognized that the various illustrative embodiments described are merely indicative of the variety of arrangements that can represent applications of the principles of the present invention. As is readily apparent from the embodiment of FIG. 10, the net output power obtainable from the various embodiments can be readily raised by the use of current and voltage step-up transformers in the sampling network 14 to increase the current and voltage drive to the active wavepath 13. It will also be recognized that the use of single transistors as the active stages is also merely illustrative of such stages. Clearly other types and arrangements of active elements can be used to form the active wavepath. Thus, numerous and varied other circuit configurations can readily be devised in accordance with these principles by those skilled in the art without departing from the spirit and scope of the invention.

What is claimed is:

1. An amplifier for coupling a signal source to an output load comprising:

a low-loss passive wavepath;

first and second amplifying stages;

one of said stages having an input impedance that is at least an order of magnitude greater than the impedance of said signal source, while the other of said stages has an input impedance that is at least an order of magnitude smaller than the impedance of said signal source;

one of said stages having an output impedance that is at least an order of magnitude greater than the impedance of said output load, while the other of said stages has an output impedance that is at least an order of magnitude smaller than the impedance of said output load;

an input circuit for coupling said signal source to said amplifying stages and to said passive wavepath including:

means for sensing the current flowing into said passive wavepath and coupling a current proportionate thereto into said lower input impedance stage;

and means for sensing the voltage at the input end of said wavepath and for coupling a voltage proportionate thereto to the higher input impedance stage;

and a signal injection network for constructively summing in said output load the signal at the output end of said passive wavepath and the output signals from said two stages.

2. The amplifier according to claim 1 wherein one amplifying stage comprises a transistor connected in the common base configuration, and the other amplifying stage comprises a transistor connected in the common collector configuration.

3. The amplifier according to claim 1 wherein said input circuit comprises:

a two winding transformer having one winding connected in series between said signal source and said passive wavepath, and a second winding connected to the input terminals of said lower input impedance stage.

4. The amplifier according to claim 1 wherein the voltage applied to the input end of said wavepath is coupled to said higher input impedance stage by means of a step-up autotransformer.

5. The amplifier according to claim 1 wherein;

said signal injection network includes a hybrid coupler having two pair of conjugate branches 1–2, and 3–4;

and wherein;

the passive wavepath is connected to coupler branch 1;

the output signals from said two stages are coupled to coupler branch 2;

the output load is connected to coupler branch 3;

and a terminating impedance is connected to coupler branch 4.

6. The amplifier according to claim 5 wherein;

the lower output impedance stage is coupled to coupler branch 2 through a series-connected matching impedance.

7. The amplifier according to claim 1 wherein;

said signal injection network comprises a first hybrid coupler having two pair of conjugate branches 1′–2′, and 3′–4′, and a second hybrid coupler having two pair of conjugate branches 1–2 and 3–4;

and wherein;

said amplifying stages are connected, respectively, to coupler branches 1′ and 2′;

the passive wavepath and coupler branch 3′ are connected, respectively, to coupler branches 1 and 2;

the output load is connected to coupler branch 3;

and a terminating impedance is connected to each of the coupler branches 4′ and 4.

8. The amplifier according to claim 1 wherein said signal injection network includes an autotransformer, and a hybrid coupler having two pair of conjugate branches 1–2 and 3–4;

and wherein said amplifying stages are connected, respectively, to opposite ends of said transformer;

the passive wavepath and a tap along said transformer are connected respectively to coupler branches 1 and 2;

the output load is connected to coupler branch 3;

and terminating impedances are connected, respectively, across said transformer and to coupler branch 4.

9. The amplifier according to claim 1 wherein;

said signal injection network comprises a 1:1 turns ratio transformer;

and wherein;

the lower output impedance stage is connected across one transformer winding;

the second transformer winding is connected in series between said passive wavepath and said output load;

and the higher output impedance stage is connected to a center-tap on said second transformer winding.

10. An amplifier for coupling a signal source to an output load comprising:

an input hybrid coupler and an output hybrid coupler, each of which has two pairs of conjugate branches;

a pair of signal amplifying stages, each of which couples, respectively, one branch of one pair of conjugate branches of the input coupler to a branch of one pair of conjugate branches of the output coupler;

characterized in that:

one of said stages has an input impedance that is at least an order of magnitude greater than the impedance of said signal source, while the other of said stages has an input impedance that is at least an order of magnitude smaller than the impedance of said signal source;

one of said stages has an output impedance that is at least an order of magnitude greater than the impedance of said load, while the other of said stages has an output impedance that is at least an order of magnitude smaller than the impedance of said load impedance;

a third branch of said input coupler constitutes the input port of said amplifier;

a third branch of said output coupler constitutes the output port of said amplifier;

and in that a low-loss, passive wavepath connects the fourth branch of said input coupler to the fourth branch of said output coupler.

11. The amplifier according to claim 10 wherein said passive wavepath includes therein time delay and phase shift means.

* * * * *